United States Patent
Ben-Simhon et al.

(10) Patent No.: US 12,204,587 B2
(45) Date of Patent: Jan. 21, 2025

(54) DOCUMENT SIMILARITY THROUGH REFERENCE LINKS

(71) Applicant: INTUIT INC., Mountain View, CA (US)

(72) Inventors: Yonatan Ben-Simhon, Tel Aviv (IL); Rami Cohen, Ashkelon (IL); Oren Sar Shalom, Nes Ziona (IL); Alexander Zhicharevich, Petah Tikva (IL)

(73) Assignee: Intuit Inc., Mountain View, CA (US)

( * ) Notice: Subject to any disclaimer, the term of this patent is extended or adjusted under 35 U.S.C. 154(b) by 1273 days.

(21) Appl. No.: 16/667,189

(22) Filed: Oct. 29, 2019

(65) Prior Publication Data

US 2021/0124783 A1    Apr. 29, 2021

(51) Int. Cl.
*G06F 16/9032* (2019.01)
*G06F 17/18* (2006.01)
*G06F 18/22* (2023.01)
*G06N 3/04* (2023.01)

(52) U.S. Cl.
CPC ........ *G06F 16/90332* (2019.01); *G06F 17/18* (2013.01); *G06F 18/22* (2023.01); *G06N 3/04* (2013.01)

(58) Field of Classification Search
CPC .... G06F 16/90332; G06F 17/18; G06F 40/35; G06K 9/6215; G06N 3/04; G06N 3/0454; G06N 3/0445; G06N 3/084
See application file for complete search history.

(56) References Cited

U.S. PATENT DOCUMENTS

| | | | |
|---|---|---|---|
| 2010/0191686 A1* | 7/2010 | Wang | G06F 16/33 707/E17.014 |
| 2010/0235343 A1* | 9/2010 | Cao | G06F 16/951 707/E17.108 |
| 2020/0184019 A1* | 6/2020 | Yu | G06N 3/0481 |

OTHER PUBLICATIONS

S. Minaee and Z. Liu, "Automatic question-answering using a deep similarity neural network," 2017 IEEE Global Conference on Signal and Information Processing (GlobalSIP), 2017, pp. 923-927, doi: 10.1109/GlobalSIP.2017.8309095 (Year: 2017).*

* cited by examiner

*Primary Examiner* — Sanjiv Shah
*Assistant Examiner* — Samuel C Sharpless, III
(74) *Attorney, Agent, or Firm* — Patterson + Sheridan, LLP

(57) ABSTRACT

Aspects of the present disclosure provide techniques for predicting content relevant to questions based on reference links. Embodiments include receiving a set of question and answer (Q/A) pairs and identifying a set of references in the set of Q/A pairs that link pairs of Q/A pairs of the set of Q/A pairs. Embodiments include identifying popular Q/A pairs of the set of Q/A pairs based on the set of references. The popular Q/A pairs may be referenced by a subset of the set of Q/A pairs and each respective Q/A pair of the subset of the set of Q/A pairs may comprise a respective question of a plurality of questions. Embodiments include training a model based on the plurality of questions, the popular Q/A pairs, and the set of references, to predict Q/A pairs of the set of Q/A pairs that are relevant to a given question.

20 Claims, 7 Drawing Sheets

DOCUMENT SIMILARITY THROUGH REFERENCE LINKS

INTRODUCTION

Aspects of the present disclosure relate to techniques for providing relevant question and answer pairs in response to queries in computing applications. In particular, embodiments described herein involve using machine learning techniques to identify question and answer pairs relevant to a query based on query-question and query-answer similarities.

Software applications often allow users to submit questions, such as through an automated help system or a community forum, in order to, for example, receive assistance with issues. Such applications may employ techniques to identify content, such as existing answers to previously-submitted questions or content generated by a support professional, which is relevant to a question submitted by a user. The ability to effectively identify relevant content in response to a question submitted by a user may prevent the user needing to seek further assistance, such as live support, and may therefore improve the user's experience of the application while reducing costs for the software provider.

Conventional techniques for identifying content related to a question often involve semantic analysis of questions and content in order to identify similarities. While these techniques may be helpful in some circumstances, they may not always identify latent or implicit similarities. For example, because different terminology may be used to describe related concepts, existing techniques may fail to identify relevant content for a question where there is semantic similarity but terminological variation. Thus a user may be left to rely on time-consuming live support sessions, which are costly to the software provider, and which may ultimately lead to the user abandoning the application.

Accordingly, there is a need in the art for improved techniques for automatically identifying content that is relevant to a question without human intervention.

BRIEF SUMMARY

Certain embodiments provide a method. The method generally includes: receiving a set of question and answer (Q/A) pairs; identifying a set of references in the set of Q/A pairs that link pairs of Q/A pairs of the set of Q/A pairs; identifying popular Q/A pairs of the set of Q/A pairs based on the set of references, wherein: the popular Q/A pairs are referenced by a subset of the set of Q/A pairs; and each respective Q/A pair of the subset of the set of Q/A pairs comprises a respective question of a plurality of questions; and training a model based on the plurality of questions, the popular Q/A pairs, and the set of references, to predict Q/A pairs of the set of Q/A pairs that are relevant to a given question Other embodiments provide a method. The method generally includes: receiving a question that was input via a user interface; generating a multi-dimensional representation of the question; providing the multi-dimensional representation of the question as an input to a model, wherein the model has been trained based on a set of references in a set of question and answer (Q/A) pairs that link pairs of Q/A pairs of the set of Q/A pairs; receiving, as an output from the model, a set of probabilities indicating whether each respective Q/A pair of a subset of the set of Q/A pairs is relevant to the question; determining, based on the set of probabilities, that at least one Q/A pair of the subset is relevant to the question; and displaying an indication via the user interface that the at least one Q/A pair is relevant to the question.

Other embodiments provide a system comprising one or more processors and a non-transitory computer-readable medium comprising instructions that, when executed by the one or more processors, cause the system to perform a method. The method generally includes: receiving a set of question and answer (Q/A) pairs; identifying a set of references in the set of Q/A pairs that link pairs of Q/A pairs of the set of Q/A pairs; identifying popular Q/A pairs of the set of Q/A pairs based on the set of references, wherein: the popular Q/A pairs are referenced by a subset of the set of Q/A pairs; and each respective Q/A pair of the subset of the set of Q/A pairs comprises a respective question of a plurality of questions; and training a model based on the plurality of questions, the popular Q/A pairs, and the set of references, to predict Q/A pairs of the set of Q/A pairs that are relevant to a given question.

The following description and the related drawings set forth in detail certain illustrative features of one or more embodiments.

BRIEF DESCRIPTION OF THE DRAWINGS

The appended figures depict certain aspects of the one or more embodiments and are therefore not to be considered limiting of the scope of this disclosure.

To facilitate understanding, identical reference numerals have been used, where possible, to designate identical elements that are common to the drawings. It is contemplated that elements and features of one embodiment may be beneficially incorporated in other embodiments without further recitation.

DETAILED DESCRIPTION

Figure 1:
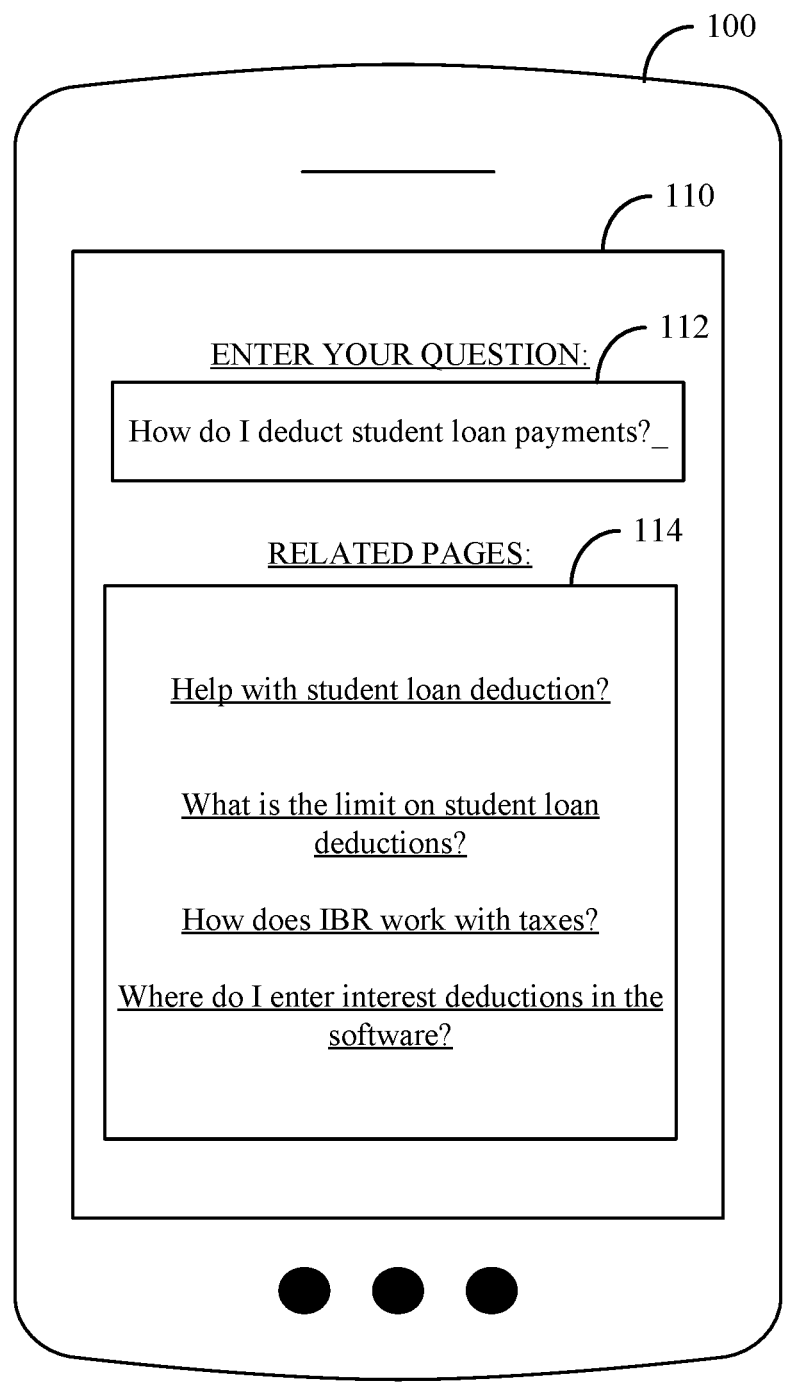
FIG. 1 depicts an example user interface for providing relevant content in response to a question.

Aspects of the present disclosure provide apparatuses, methods, processing systems, and computer readable mediums for determining content relevant to a question based on reference links.

Computing applications often allow users to submit questions related to application usage, such as in order to receive responses from members of a community forum or to retrieve content through an automated support system. Over time, applications tend to collect a large amount of question and answer (Q/A) pairs including user questions answered by community users and professionals, as well as Q/A pairs generated as support content by support professionals.

Consider an example where a user asks the question (Q): "how do I install the application?" An answer to the question (A) may reference another Q/A pair, such as by including a reference link to the other Q/A pair. For instance, the Q/A pair may include a link to another Q/A pair with an answer to the related question of "what are the system requirements for the application?", which has it's own paired answer Further, the Q/A pair containing the answer of the original question ("how do I install the application?") may include content related to the system requirement Q/A pair, such as "before installing, please verify that your computer meets the system requirements. See 'what are the system requirements?' for information on system requirements," including a link to the Q/A pair corresponding to the question "what are the system requirements?"

Reference links between Q/A pairs can be a useful indicator that two Q/A pairs are related to one another. Furthermore, if a first Q/A pair is referenced by both a second Q/A pair and a third Q/A pair, this may be an indicator that the second Q/A pair and the third Q/A pair are related to one another. Accordingly, embodiments of the present disclosure involve designing machine learning models to output probabilities that given Q/A pairs are relevant to a given question based on analysis of reference relationships and semantic concepts. In particular, certain embodiments involve training a machine learning model based on reference links to predict Q/A pairs that are likely to be relevant to a given question.

Machine Learning Concepts

Models described herein may be machine learning models, which allow computing systems to improve and refine functionality without explicitly being programmed. Generally, given a set of training data, a machine learning model can generate and refine a function that determines a target attribute value based on one or more input features. For example, if a set of input features describes an automobile and the target value is the automobile's gas mileage, a machine learning model can be trained to predict gas mileage based on the input features, such as the automobile's weight, tire size, number of cylinders, coefficient of drag, and engine displacement.

The predictive accuracy a machine learning model achieves ultimately depends on many factors. Ideally, training data for the machine learning model should be representative of the population for which predictions are desired (e.g., unbiased and correctly labeled). In addition, training data should include a large number of training instances relative to the number of features on which predictions are based and relative to the range of possible values for each feature.

In some embodiments, the model is a neural network model. Neural network models generally include a plurality of connected units or nodes, which may also be referred to as artificial neurons. Each node generally has one or more inputs with associated weights, a net input function, and an activation function. Nodes are generally included in a plurality of connected layers, where nodes of one layer are connected to nodes of another layer, with various parameters governing the relationships between nodes and layers and the operation of the neural network.

According to certain embodiments, a model for predicting Q/A pairs relevant to a question comprises a neural network that includes an embedding layer, which is an input layer that accepts multi-dimensional representations of questions as inputs. For example, representations of words in questions may be vectors comprising a series of n values that define a position in n-dimensional space. In some embodiments, existing techniques such as Word2Vec and/or GloVe embeddings are employed to generate word representations based on questions. A representation of a question may also be a matrix comprising a vector for each word in the question (in some embodiments, some words are not included in the representation, such as redundant and/or filler words).

An embedding layer generally compresses an input feature space into a smaller one. For example, an embedding layer may accept a question representation with more dimensions than an output dimension of the model and compress it by finding an optimal mapping of each unique word in the representation to a vector of real numbers that is equal to the size of the output dimension of the model. In certain embodiments, the representations are further improved through the use of a long short-term memory (LSTM) layer or a bi-directional LSTM (Bi-LSTM) layer or gated recurrent unit (GRU) of the model, which may immediately follow the embedding layer.

The model may further include one or more fully connected layers (e.g., where every neuron in one layer is connected to every neuron in another layer). In some embodiments, a softmax layer is included immediately after the one or more fully connected layers. For example, the softmax layer may be an output layer or may be immediately followed by an output layer. A softmax function is a type of squashing function with an output limited to the range of 0 to 1, thereby allowing the output to be interpreted directly as a probability. Softmax functions are multi-class sigmoids, and they may be used in determining probabilities of multiple classes at once. Because the outputs of a softmax function may be interpreted as probabilities (e.g., they must sum to 1), a softmax layer may be used as the final hidden layer in a neural network. A softmax layer will have the same number of nodes as the output later. In other embodiments, the softmax layer is the output layer of the model.

In an example, a neural network may be attempting to determine if there is a cat present in an image. Without a softmax layer, the neural network may be able to produce a probability that a cat is in the image. A softmax layer allows the neural network to run a multi-class function so that it can determine the probability that the cat is in the image, as well as the probability that additional subjects (e.g., dogs, cars, or the like) are included as well.

In some embodiments, the model is trained on an entire data set of Q/A pairs, and the training data includes associations between representations of questions and Q/A pairs that are referenced in the answers to the questions. In alternative embodiments, popular Q/A pairs are identified by determining which Q/A pairs are most commonly referenced by other Q/A pairs.

For example, in some embodiments, a top percentage of the most popular Q/A pairs may be identified or all Q/A pairs referenced by a threshold number of other Q/A pairs may be selected. In certain embodiments, given Q/A pairs are determined to be popular Q/A pairs based on the number of answers in other Q/A pairs that reference the given Q/A pairs. Popular Q/A pairs and questions in Q/A pairs that reference them may then be used to train the model to predict Q/A pairs that are likely to be relevant to a given question. For example, the model may be trained to output a probability for each given popular Q/A pair of the popular Q/A pairs indicating whether the given popular Q/A pair is likely to be relevant to the question that is input into the model. A "popular" Q/A pair, as used herein, generally refers to a Q/A pair that is frequently referenced by other Q/A pairs, such as a Q/A pair that is referenced by a threshold number of Q/A pairs or a Q/A pair that is in a top percentage of most frequently referenced Q/A pairs. Using popular Q/A pairs, rather than all Q/A pairs in a data set, to train a model may reduce the resources required to train the model while focusing the model on Q/A pairs that are likely to be relevant to a large number of questions.

In certain embodiments, after the model has been trained based on the popular Q/A pairs, the trained model is run on the questions from all Q/A pairs in the data set (e.g., not just popular Q/A pairs and Q/A pairs that reference them). Thus, for each given question, the model outputs a set of respective probabilities representing a likelihood that each respective popular Q/A pair is relevant to the given question. Because the model is only trained to output probabilities for popular Q/A pairs in certain embodiments, it is useful to identify other Q/A pairs that are similar to the popular Q/A pairs so that these other Q/A pairs may also be recommended in response to a question for which certain popular Q/A pairs are determined to be relevant.

As such, to identify Q/A pairs that are similar to one another, the sets of probabilities output by the model for all of the questions, including questions of the popular Q/A pairs, may be used to further identify similarities between questions. For example, a cosine similarity may be calculated between the sets of probabilities for each given pair of questions to determine a similarity measure for the given pair. Questions that are determined to be similar in this way may be grouped. As such, whenever a new question (e.g., entered by a user) is input into the model, the probabilities output by the model with respect to the popular Q/A pairs can also be used to determine which other Q/A pairs (e.g., the non-popular Q/A pairs) may be relevant to the new question. For example, if a certain popular Q/A pair is determined to have a high probability of being relevant to the new question, then other Q/A pairs grouped with the certain popular Q/A pair based on similarity measures may also be determined to be likely to be relevant to the new question.

In this way, the model may be trained only on popular Q/A pairs while still allowing all Q/A pairs relevant to a given question to be determined. Training the model using only the most popular Q/A pairs and then extrapolating these results to all Q/A pairs based on similarities in probabilities as described above reduces the resources required to train the model and reduces bias that may result from certain Q/A pairs being disproportionately referenced compared to other Q/A pairs.

In an embodiment, a question input is input by a user. A representation of the question is generated and provided to the model, and the model outputs a set of probabilities for the question indicating likelihood that each respective popular Q/A pair is relevant to the question. Other, non-popular Q/A pairs that are determined to be similar to the popular Q/A pairs with high relevance probabilities for the question may also be determined to be relevant to the question.

Accordingly, techniques described herein allow relevant Q/A pairs to a given question to be identified and provided in response to the given question. For example, Q/A pairs relevant to a question entered by a user may be provided to the user via a user interface.

In other embodiments, when a user views an existing Q/A pair, other relevant Q/A pairs to the existing Q/A pair may be determined as described herein and recommended to the user. As such, embodiments of the present disclosure improve software applications by automatically identifying latent or implicit relationships between Q/A pairs and questions and proactively providing useful Q/A pairs to users. Techniques described herein improve user interfaces by reducing the time needed to locate and access relevant answers to questions within an application. Furthermore, embodiments of the present disclosure may reduce costs, avoid user error, and improve user retention associated with applications by avoiding assisted support sessions and automatically providing users with relevant content that assists in use of the applications.

Example User Interface for Providing Relevant Content in Response to a Question

FIG. 1 illustrates an example user interface 110 for providing relevant content in response to a question. User interface 110 runs on client device 100, which in this example is a mobile computing device. In alternative embodiments, client device 100 may be representative of another type of computing device, such as a laptop computer, desktop computer, or the like.

A user may access user interface 110 on client device 100 in order to interact with an application. In an example, user interface 110 is associated with a web application that runs on a remote computing device and is accessed by client device 100 over a network, while in other embodiments the application runs locally on client device 100. For example, the application may comprise an automated support system (e.g., for retrieval of frequently asked questions) and/or a community forum where users submit and answer questions.

User interface 110 includes field 112 in which a user enters a question. In this example, the user enters the question "How do I deduct student loan payments?" For example, user interface 110 may correspond to a tax preparation application.

User interface 110 further comprises field 114, in which related Q/A pairs to the question entered in field 112 are displayed. For example, as the user enters the question in field 112, the application may use a model that has been trained based on reference links between Q/A pairs to determine a set of Q/A pairs that are likely to be relevant to the question entered in field 112.

Field 114 displays the questions from a plurality of Q/A pairs that are determined likely to be relevant to the question entered in field 112. These include "Help with student loan deduction?"; "What is the limit on student loan deductions?"; "How does IBR work with taxes?" and "Where do I enter interest deductions in the software?" In this example, some of the relevant Q/A pairs are semantically similar to the question entered in field 112, including similar words such as student, loan, and deduction. However, other relevant Q/A pairs are not semantically similar to the question entered in field 112, such as "How does IBR work with taxes?" These Q/A pairs may have been determined to be relevant by the model due to the model's training based on reference links between Q/A pairs as described herein. By contrast, conventional techniques for identifying content relevant to a question based only on semantic analysis may have failed to identify these Q/A pairs as relevant.

The user may select any of the questions listed in field 114 to access corresponding Q/A pairs including answers to the questions listed.

It is noted that user interface 110 is included as an example, and other layouts and techniques for displaying relevant content to users of applications based on questions may be employed with techniques described herein.

Figure 2:
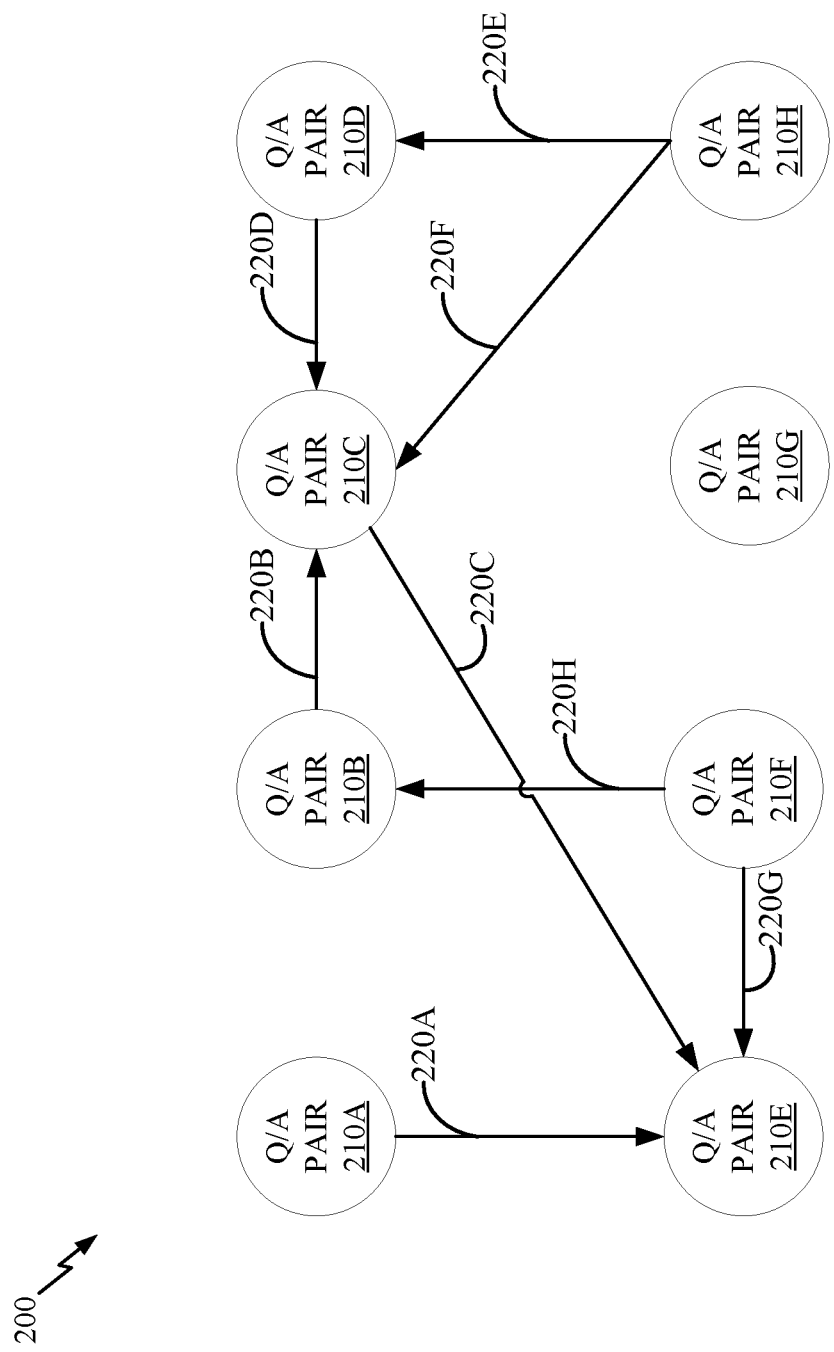
FIG. 2 depicts an example of reference links between question and answer (Q/A) pairs.

Training a Model to Determine Content Relevant to a Question Based on Reference Links FIG. 2 illustrates an example 200 of reference links between question and answer (Q/A) pairs. FIG. 2 is described in conjunction with FIG. 3, which illustrates an example 300 of Q/A pairs with a reference link.

Example 200 includes Q/A pairs 210A-H (collectively, Q/A pairs 210), each of which represents a Q/A pair including a question and an answer. Q/A pairs 210A-H may include questions submitted by users to a community forum and answered by other users and/or professionals, as well as Q/A pairs generated by support professionals as automated support content.

Reference links 220A-H (collectively, reference links 220) represent references among Q/A pairs 210. For example, references 220B, 220D, and 220F represent references to Q/A pair 210C included in Q/A pairs 210B, 210D, and 210H. Reference link 220E represents a reference to Q/A pair 210D included in Q/A pair 210H. Reference link 220F represents a reference to Q/A pair 210C included in Q/A pair 210H. Reference link 220H represents a reference to Q/A pair 210B included in Q/A pair 210F. Reference links 220A, 220C, and 220G represent references to Q/A pair 210E included in Q/A pairs 210A, 210C, and 210F.

Figure 3:
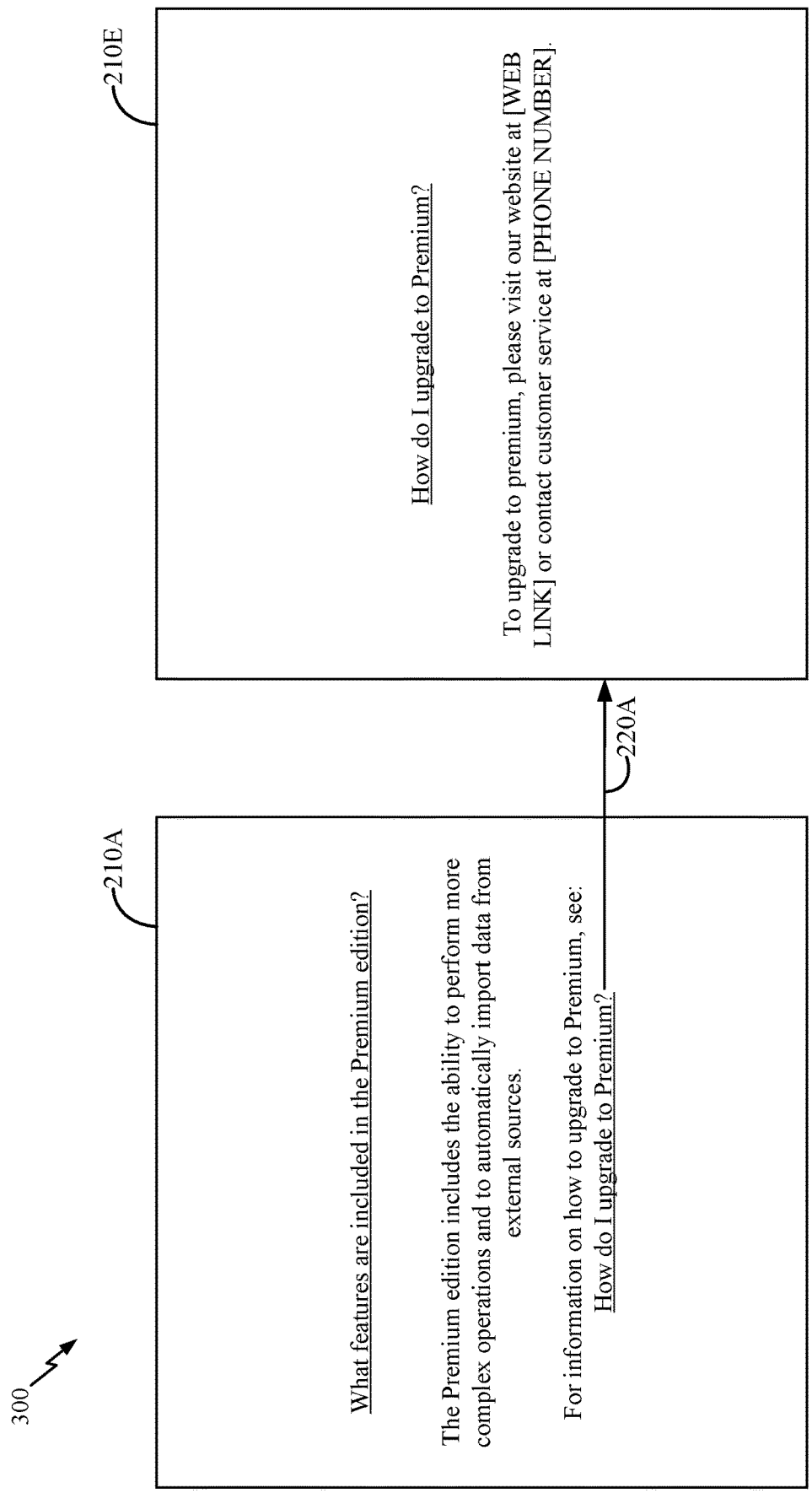
FIG. 3 depicts example Q/A pairs with a reference link.

For example, as shown in example 300 of FIG. 3, Q/A pair 210A includes the question "What features are included in the Premium edition?" Q/A pair 210A includes an answer to the question that lists some of the features of the premium edition of the application as well as a reference to Q/A pair 210E for "information on how to upgrade to Premium." Reference link 220A links to Q/A pair 210E, which includes the question "How do I upgrade to Premium?" and an associated answer.

Reference links 220 are used to train a model, such as a neural network model. In some embodiments, the neural network model has a structure comprising an embedding layer, an LSTM layer, one or more fully connected layers, and a softmax layer, as described further below with respect to FIG. 4.

Training the model may involve providing a given question representation in a training data set as an input to the first layer of the model and iteratively adjusting parameters of the model until outputs of the model match training outputs associated with the given question in the training data (e.g., the training outputs may indicate which Q/A pairs were actually referenced by the answer to the given question). In some embodiments, backpropagation is used to train the model. Backpropagation refers to a process of calculating a gradient at the maximum of a cost function, comparing recreated input with the actual input. By propagating this gradient "back" through the layers of the model, the weights can be modified to produce more accurate outputs on subsequent attempts to recreate the input.

In some embodiments, the most "popular" (e.g., highly referenced) Q/A pairs 210 are identified based on reference links 220. For example, the top twenty-five percent most popular Q/A pairs 210 may be identified. In example, 200, Q/A pairs 210C and 210E are identified as the most popular Q/A pairs 210, as they are linked to by the largest number of reference links 220. In particular, Q/A pairs 210C and 210E are the two most referenced of the eight Q/A pairs 210, and as such, represent the top twenty-five percent most popular Q/A pairs 210. A percentage is only included as one example, and other techniques may be used to select a subset of Q/A pairs 210 including the most popular Q/A pairs 210 for use in training a model.

Once Q/A pairs 210C and 210E are identified as the most popular, a training data set is generated based on Q/A pairs 210C and 210E, the Q/A pairs that reference them (e.g., Q/A pairs 210A, 210B, 210C, 210D, 210F, and 210H), and the reference links between them (e.g., reference links 220A, 220B, 220C, 220D, 220F, and 220G).

In an example training data instance, a multi-dimensional representation of the question in Q/A pair 210A is associated with a training output indicating that popular Q/A pair 210E is relevant to the question based on reference link 220A and that popular Q/A pair 210C is not relevant to the question (because there is no reference link between the two). For example, each word in the question "What features are included in the Premium edition" may be represented as an n-dimensional vector representing a point in n-dimensional space, and these vectors may be combined to form a matrix representing the question. This representation is provided as an input to the model, and the parameters of the model are iteratively adjusted until the model outputs a probability above a threshold that Q/A pair 210E is relevant to the question and a probability below a threshold that Q/A pair 210C is relevant to the question. In alternative embodiments, the model is trained only on positive associations, rather than including negative associations such as the lack of reference link between Q/A pair 210A and Q/A pair 210C.

Once the model has been trained, it will accept a representation of a given question as an input and, in response, will output a set of two probabilities, the first probability indicating a likelihood that popular Q/A pair 210C is relevant to the given question and the second probability indicating a likelihood that popular Q/A pair 210E is relevant to the given question.

It is noted that Q/A pairs 210 and reference links 220 are included for illustration purposes, and actual data sets and numbers of popular Q/A pairs are likely to be much larger. Furthermore, alternative embodiments involve training the model based on all Q/A pairs in the data set instead of only the most popular Q/A pairs.

Using a Trained Model to Determine Content Relevant to a Question

Figure 4:
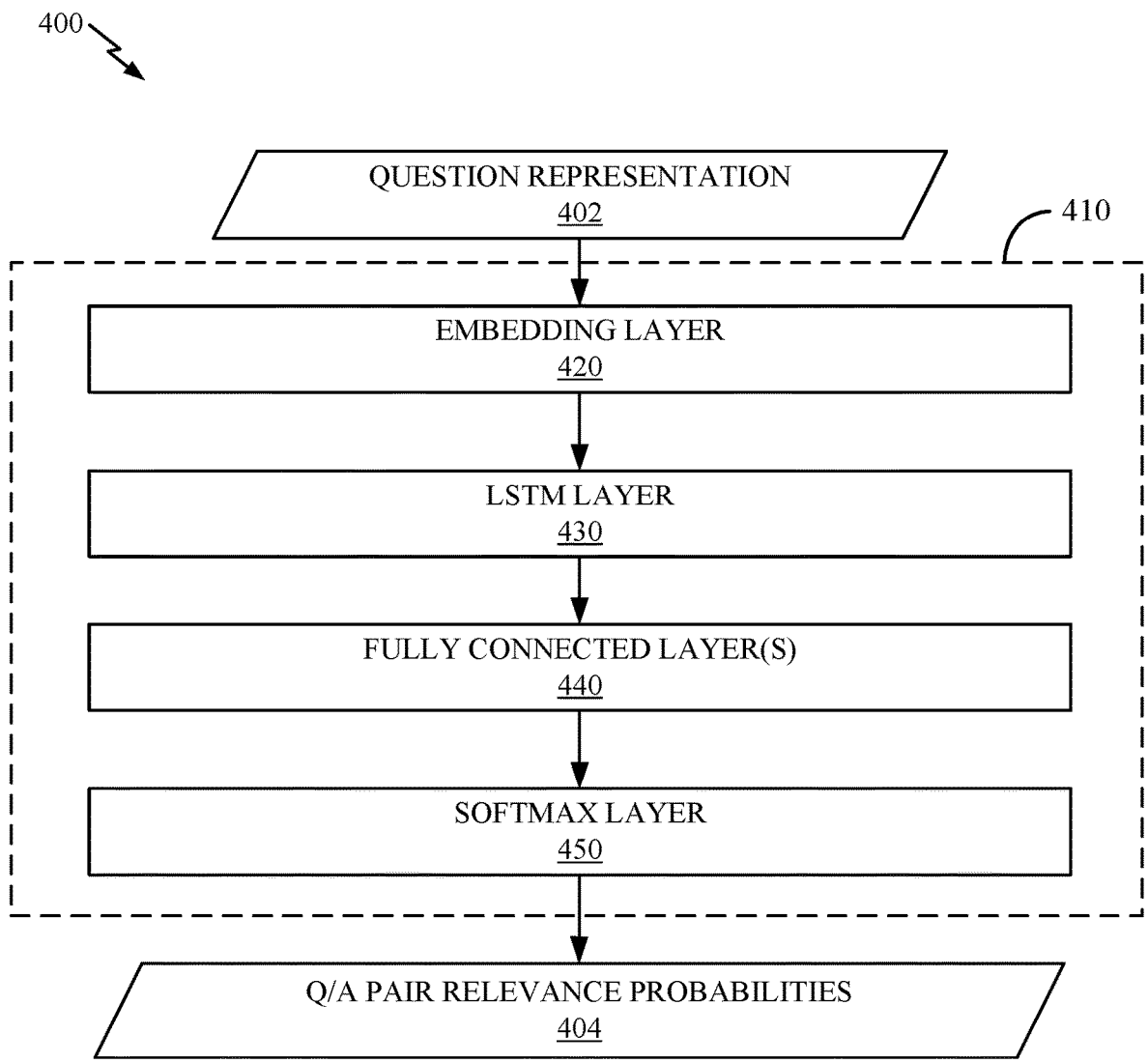
FIG. 4 depicts an example model for predicting content relevant to a question based on reference links.

FIG. 4 depicts an example 400 of a model for predicting content relevant to a question based on reference links.

Example 400 includes model 410, which is a neural network model that has been trained based on reference links between Q/A pairs as described above with respect to FIGS. 2 and 3. Model 410 comprises an embedding layer 420 that accepts a question representation 402 as an input and compresses the input feature space into a smaller one. In certain embodiments, question representation 402 is a matrix comprising a respective vector representing each respective word in a question input by a user. Embedding layer 420 may perform matrix multiplication that transforms word representations into corresponding word embeddings and/or converts positive integers into dense vectors of a given size.

Model 420 further comprises an LSTM layer 430, which in this example is a bi-directional LSTM layer that further improves the question representation. Each node or neuron in LSTM layer 420 generally includes a cell, an input gate, an output gate and a forget gate. The cell generally stores or "remembers" values over certain time intervals in both a backward direction (e.g., data input to the node) and a forward direction (e.g., data output by the node), and the gates regulate the flow of data into and out of the cell. As such, LSTM layer 430 hones the representation by modifying vectors of words based on remembered data, such as vectors of words preceding and following a given word in a question, thereby providing a more contextualized representation of each word.

For example, if a question includes the word "happy" preceded by the word "not", the vector representing happy may be modified to a different multi-dimensional representation to reflect the more negative sentiment implied by the preceding word "not". The gates may be used to determine which contextual information is remembered by the cell with respect to a given word, such as the neighboring words within a certain distance or within the same sentence, and which contextual information is forgotten by the cell, such as all data relevant to a preceding sentence that has ended.

Model 410 further comprises one or more fully connected layers 440, which may apply various functions to different parts of the question representation, such as different word vectors, with respect to each potentially relevant Q/A pair (e.g., each popular Q/A pair for which the model has been trained to output a probability).

Model 410 further comprises a softmax layer 450, which may apply a softmax function to outputs from fully connected layer(s) 440. In an example, softmax layer 450 receives as an input a vector of n real numbers, and normalizes the vector into a probability distribution consisting of n probabilities, where n is the number of popular Q/A pairs on which model 410 was trained. Prior to softmax layer 450, some vector components could be negative numbers or values greater than one, and so all of the vector components might not sum to 1. After softmax layer 450, each component will fall between 0 and 1, and all of the components will add up to 1. As such, the components can be interpreted as probabilities. Specifically, the output from softmax layer 450 can be interpreted as Q/A pair relevance probabilities 404. Q/A pair relevance probabilities 404 generally comprise a probability with respect to each popular Q/A pair on which model 410 was trained and indicate a likelihood that the popular Q/A pair is relevant to the question represented by question representation 402.

In some embodiments, the technique depicted in example 400 is employed to determine a set of Q/A pair relevance probabilities for each question in each Q/A pair in the data set. In order to extrapolate outputs from the model with respect to popular Q/A pairs to other Q/A pairs, the sets of Q/A pair relevance probabilities for all of the questions may then be compared, such as through cosine similarity, to further identify relationships and/or group Q/A pairs in the data set. As such, when a given popular Q/A pair is determined to be relevant to a given question, the given popular Q/A pair may be recommended in response to question in addition to other Q/A pairs determined to be similar to the given popular Q/A pair. Q/A pair recommendations may be provided to a user in response to a question via a user interface, such as user interface 110 of FIG. 1.

Figure 5:
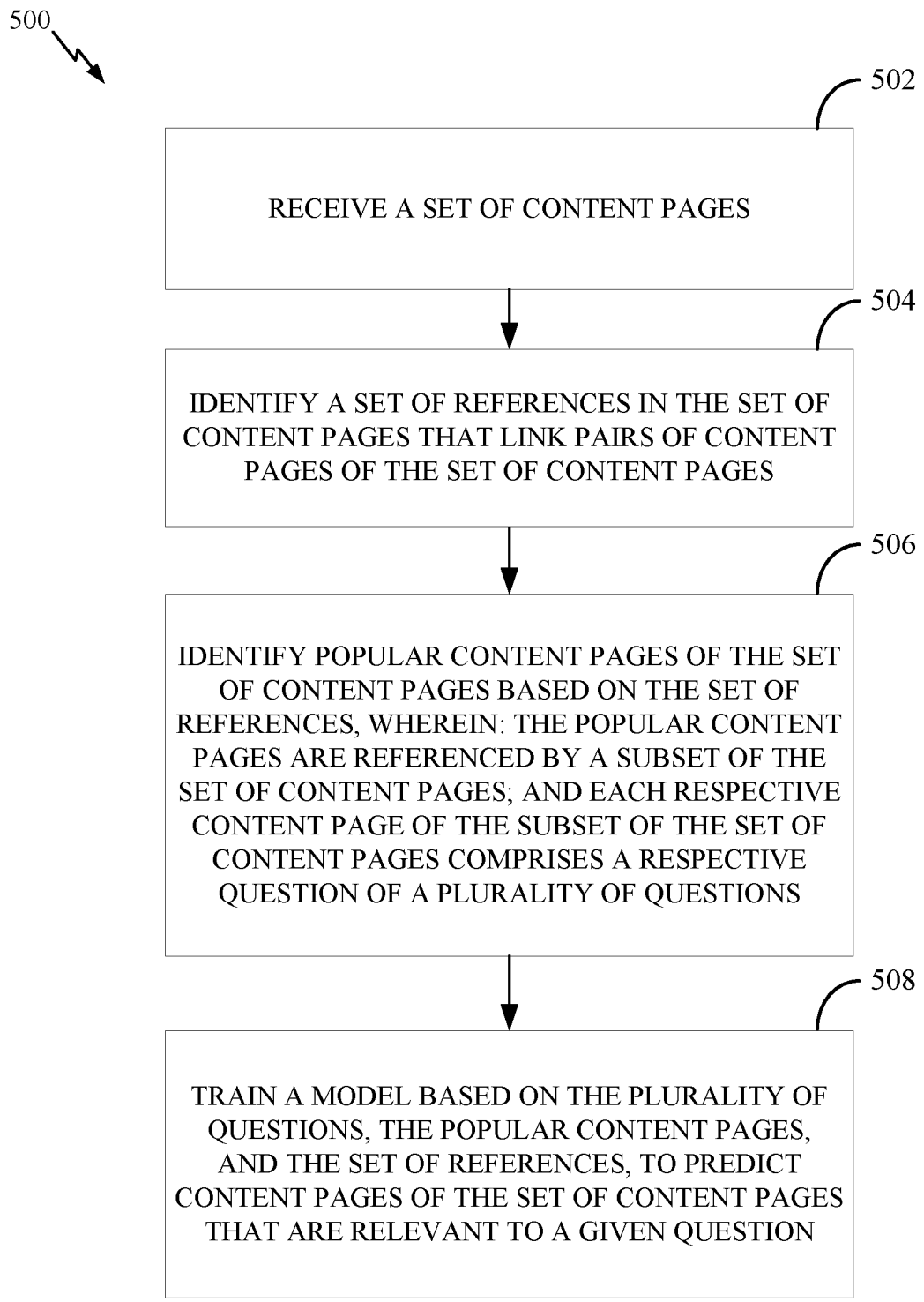
FIG. 5 depicts example operations for training a model to determine content relevant to a question based on reference links.

Example Operations for Training a Model to Determine Content Relevant to a Question FIG. 5 depicts example operations 500 for training a model to determine content relevant to a question based on reference links. In an example, operations 500 are performed by a software application running on a computing system, such as system 700 of FIG. 7, which is described below.

At step 502, a set of Q/A pairs is received. For example, a computing system may retrieve a data set including the set of Q/A pairs, which may comprise a plurality of Q/A pairs (e.g., Q/A pairs 210 of FIG. 2), from a data store related to a software application.

At step 504, a set of references in the set of Q/A pairs is identified that link pairs of Q/A pairs of the set of Q/A pairs. In an example, the computing device identifies reference links 220 between Q/A pairs 210 of FIG. 2. Each reference may be a link from a first Q/A pair in a pair to a second Q/A pair in the pair. In some embodiments, the references were added by creators of the Q/A pairs, such as users, support professionals, or application developers.

At step 506, popular Q/A pairs of the set of Q/A pairs are identified based on the set of references, wherein: the popular Q/A pairs are referenced by a subset of the set of Q/A pairs; and each respective Q/A pair of the subset of the Q/A pairs comprises a respective question of a plurality of questions.

In some embodiments, the computing device identifies the popular Q/A pairs by determining which respective Q/A pairs are referenced to by the largest numbers of Q/A pairs. In an example, a top percentage or portion of the most popular Q/A pairs are selected as the popular Q/A pairs. In another embodiment, all Q/A pairs that are referenced by more than a threshold number of other Q/A pairs are selected as the popular Q/A pairs.

In one embodiment, identifying the popular Q/A pairs of the set of Q/A pairs based on the set of references comprises: determining, for each given Q/A pair of the set of Q/A pairs, a given number of references of the set of references that reference the given Q/A pair; and determining popularities of the set of Q/A pairs based on the given number of references for each given Q/A pair of the set of Q/A pairs.

At step 508, a model is trained based on the plurality of questions, the popular Q/A pairs, and the set of references to predict Q/A pairs of the set of Q/A pairs that are relevant to a given question.

In one embodiment, the computing device generates a training data set comprising representations of each of the plurality of questions (e.g., as features) associated with indications of which popular Q/A pairs of the popular Q/A pairs each question references (e.g., as labels). The model may be trained by iteratively adjusting parameters of the model until, when the model is provided a representation of a given question of the set of questions as an input, the output from the model is consistent with the label associated with the given question's representation in the training data.

In one embodiment, training the model comprises generating a multi-dimensional representation of each given question of the plurality of questions as a set of features for the given question. Training the model may further comprise generating training data wherein the set of features for each given question of the plurality of questions is associated with each given popular Q/A pair of the set of Q/A pairs that is referenced in the set of references by a given Q/A pair of the set of Q/A pairs corresponding to the given question.

In one embodiment, the model is trained to output probabilities with respect to given Q/A pairs of the set of Q/A pairs in response to an input question, as described in more detail below with respect to FIG. 6.

In some embodiments, the plurality of questions is a subset of a set of questions included in the set of Q/A pairs. In one embodiment, for each respective question of the set of questions, respective input to the model is provided based on the respective question, and a respective set of probabilities is received as a respective output from the model in response to the respective input. In some embodiments, groups of questions of the set of questions are clustered based on the respective set of probabilities for each respective question of the set of questions.

Figure 6:
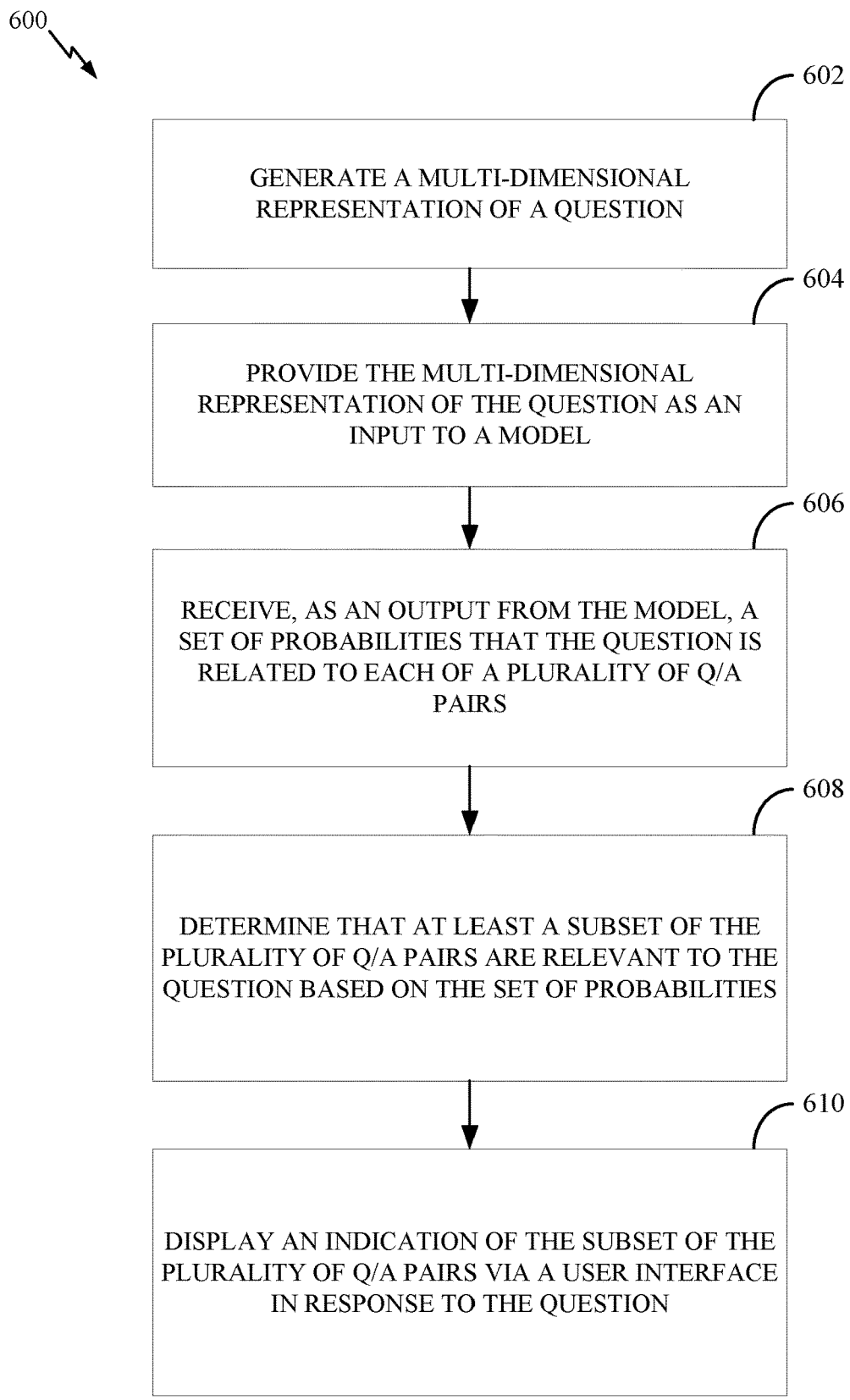
FIG. 6 depicts example operations for using a model to determine content relevant to a question based on reference links.

Example Operations for Using a Model to Determine Content Relevant to a Question FIG. 6 depicts example operations 600 for using a model to determine content relevant to a question based on reference links.

In one embodiment, operations 600 are performed by a software application running on a computing system, such as system 700 of FIG. 7, which is described below. In some embodiments, operations 600 are performed after the model has been trained as described above with respect to operations 500 of FIG. 5.

At step 602, a multi-dimensional representation of a question is generated. For example, the multi-dimensional representation may comprise a matrix made up of vectors representing each word in the question. In one embodiment, the multi-dimensional representation is generated using a technique such as Word2Vec or GloVe embeddings.

At step 604, the multi-dimensional representation of the question is provided as an input to a model, such as a neural network model. In one embodiment, the multi-dimensional representation is provided to an embedding layer, such as embedding layer 420 of model 410 of FIG. 4.

At step 606, a set of probabilities that the question is related to each of a plurality of Q/A pairs is received as an output from the model. For instance, the computing device may receive Q/A pair relevance probabilities 404 of FIG. 4 as an output from softmax layer 450 of FIG. 4.

At step 608, at least a subset of the plurality of Q/A pairs are determined to be relevant to the question based on the set of probabilities. For instance, all given Q/A pairs with a probability above a threshold may be considered to be relevant to the question. In certain embodiments, additional Q/A pairs that have been determined to be related to those determined to be relevant to the question, such as those clustered based on cosine similarities between probabilities, are also determined to be relevant to the question.

At step 610, an indication of the subset of the plurality of Q/A pairs is displayed via a user interface in response to the question. For example, the indication may include links to the subset of the plurality of Q/A pairs, indicating that these Q/A pairs are relevant to the question.

In some embodiments, a user may select one of the subset of the plurality Q/A pairs indicated as relevant in the user interface, and the selected Q/A pair may be displayed.

Example Computing System for Determining Content Relevant to a Question

Figure 7:
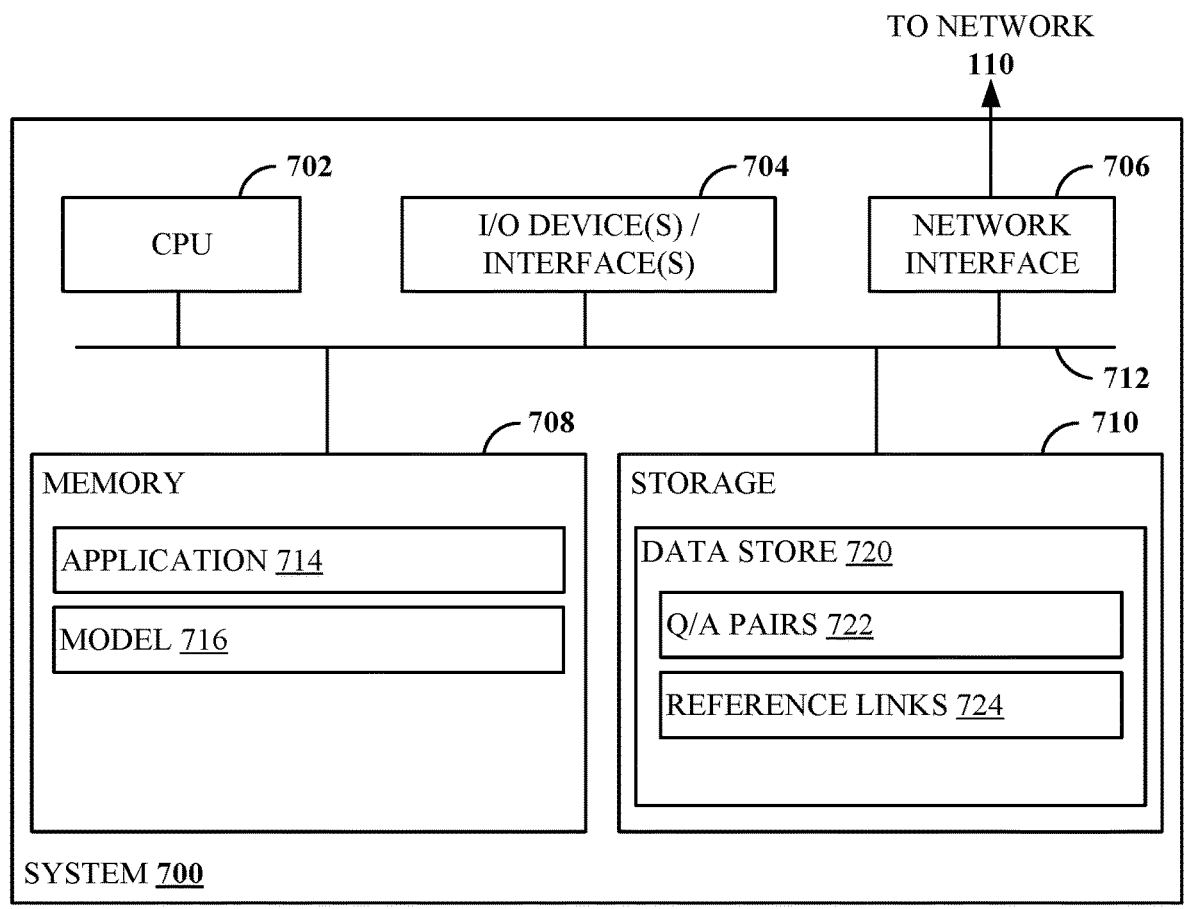
FIG. 7 depicts an example processing systems for determining content relevant to a question based on reference links.

FIG. 7 illustrates an example system 700 with which embodiments of the present disclosure may be implemented. For example, system 700 may be representative of client device 100 of FIG. 1 and/or other types of computing devices, such as a server, and may perform operations 500 and/or 600 of FIGS. 5 and 6.

System 700 includes a central processing unit (CPU) 702, one or more I/O device interfaces 704 that may allow for the connection of various I/O devices 714 (e.g., keyboards, displays, mouse devices, pen input, etc.) to the system 700, network interface 706, a memory 708, storage 710, and an interconnect 712. It is contemplated that one or more components of system 700 may be located remotely and accessed via a network. It is further contemplated that one or more components of system 700 may comprise physical components or virtualized components.

CPU 702 may retrieve and execute programming instructions stored in the memory 708. Similarly, the CPU 702 may retrieve and store application data residing in the memory 708. The interconnect 712 transmits programming instructions and application data, among the CPU 702, I/O device interface 704, network interface 706, memory 708, and storage 710. CPU 702 is included to be representative of a single CPU, multiple CPUs, a single CPU having multiple processing cores, and other arrangements.

In one embodiment, the memory 708 is a random access memory.

As shown, memory 708 includes application 714 and model 716. Application 714 may be an application that allows users to submit questions and retrieve content relevant to the questions via a user interface, such as user interface 110 of FIG. 1. Model 716 may be representative of model 410 of FIG. 4.

Storage 710 may be a disk drive, solid state drive, or a collection of storage devices distributed across multiple storage systems. Although shown as a single unit, the storage 710 may be a combination of fixed and/or removable storage devices, such as fixed disc drives, removable memory cards or optical storage, network attached storage (NAS), or a storage area-network (SAN).

Storage 710 comprises data store 720, which may be a data storage entity that stores data related to application 714 and model 716. Data store 720 comprises Q/A pairs 722 and reference links 724, which may be representative of Q/A pairs 210 and reference links 220 of FIG. 2.

The preceding description provides examples, and is not limiting of the scope, applicability, or embodiments set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

The preceding description is provided to enable any person skilled in the art to practice the various embodiments described herein. Various modifications to these embodiments will be readily apparent to those skilled in the art, and the generic principles defined herein may be applied to other embodiments. For example, changes may be made in the function and arrangement of elements discussed without departing from the scope of the disclosure. Various examples may omit, substitute, or add various procedures or components as appropriate. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and other operations. Also, "determining" may include receiving (e.g., receiving information), accessing (e.g., accessing data in a memory) and other operations. Also, "determining" may include resolving, selecting, choosing, establishing and other operations.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

A processing system may be implemented with a bus architecture. The bus may include any number of interconnecting buses and bridges depending on the specific application of the processing system and the overall design constraints. The bus may link together various circuits including a processor, machine-readable media, and input/output devices, among others. A user interface (e.g., keypad, display, mouse, joystick, etc.) may also be connected to the bus. The bus may also link various other circuits such as timing sources, peripherals, voltage regulators, power management circuits, and other types of circuits, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer-readable medium. Software shall be construed broadly to mean instructions, data, or any combination thereof, whether referred to as software, firmware, middleware, microcode, hardware description language, or otherwise. Computer-readable media include both computer storage media and communication media, such as any medium that facilitates transfer of a computer program from one place to another. The processor may be responsible for managing the bus and general processing, including the execution of software modules stored on the computer-readable storage media. A computer-readable storage medium may be coupled to a processor such that the processor can read information from, and write information to, the storage medium. In the alternative, the storage medium may be integral to the processor. By way of example, the computer-readable media may include a transmission line, a carrier wave modulated by data, and/or a computer readable storage medium with instructions stored thereon separate from the wireless node, all of which may be accessed by the processor through the bus interface. Alternatively, or in addition, the computer-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module, it will be understood that such functionality is implemented by the processor when executing instructions from that software module.

The following claims are not intended to be limited to the embodiments shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method, comprising:
receiving a set of question and answer (Q/A) pairs;
identifying a set of references in the set of Q/A pairs that link pairs of Q/A pairs of the set of Q/A pairs, wherein the set of references is based on at least an identifier of a first Q/A pair of the set of Q/A pairs being included in a second Q/A pair of the set of Q/A pairs;
identifying popular Q/A pairs of the set of Q/A pairs based on the set of references, wherein:
the popular Q/A pairs are referenced by a subset of the set of Q/A pairs;
identifiers of the popular Q/A pairs are included in specific Q/A pairs of the subset of the set of Q/A pairs; and
each respective Q/A pair of the subset of the set of Q/A pairs comprises a respective question of a plurality of questions; and
training a machine learning model through a supervised learning process to predict Q/A pairs of the set of Q/A pairs that are relevant to a given question, wherein the supervised learning process comprises providing a particular question of the plurality of questions to the machine learning model, receiving a prediction from the machine learning model as to whether a popular Q/A pair of the Q/A pairs is relevant to the particular question, and iteratively adjusting parameters of the machine learning model based on comparing the prediction to a label that is based on whether the set of references indicates that the popular Q/A pair is relevant to the particular question.

2. The method of claim 1, wherein identifying the popular Q/A pairs of the set of Q/A pairs based on the set of references comprises:
determining, for each given Q/A pair of the set of Q/A pairs, a given number of references of the set of references that reference the given Q/A pair; and
determining popularity metrics for the set of Q/A pairs based on the given number of references for each given Q/A pair of the set of Q/A pairs.

3. The method of claim 1, wherein training the machine learning model comprises:
generating a multi-dimensional representation of each given question of the plurality of questions as a set of features for the given question; and
generating training data wherein the set of features for each given question of the plurality of questions is associated with each given popular Q/A pair of the set of Q/A pairs that is referenced in the set of references by a given Q/A pair of the set of Q/A pairs corresponding to the given question.

4. The method of claim 1, wherein the machine learning model is trained to output probabilities with respect to given Q/A pairs of the set of Q/A pairs in response to an input question.

5. The method of claim 1, wherein the plurality of questions is a subset of a set of questions included in the set of Q/A pairs, and wherein the method further comprises:
for each respective question of the set of questions:
providing respective input to the machine learning model based on the respective question; and
receiving a respective set of probabilities as a respective output from the machine learning model in response to the respective input.

6. The method of claim 5, further comprising identifying groups of questions of the set of questions based on the respective set of probabilities for each respective question of the set of questions.

7. The method of claim 6, further comprising providing relevant questions to a particular question via a user interface based on outputs from the machine learning model in response to the particular question and the groups of questions.

8. The method of claim 1, wherein the machine learning model is a neural network comprising: an embedding layer; a long short term memory (LSTM) layer; one or more fully connected layers; and a softmax layer.

9. A method, comprising:
receiving a question that was input via a user interface;
generating a multi-dimensional representation of the question;
providing the multi-dimensional representation of the question as an input to a machine learning model, wherein the machine learning model has been trained through a supervised learning process comprising:
providing a particular question of a plurality of questions corresponding to a set of question and answer (Q/A) pairs to the machine learning model;
receiving a prediction from the machine learning model as to whether a popular Q/A pair of the set of Q/A pairs is relevant to the particular question, wherein the popular Q/A pair was identified based on a set of references that is based on at least an identifier of a first Q/A pair of the set of Q/A pairs being included in a second Q/A pair of the set of Q/A pairs; and
iteratively adjusting parameters of the machine learning model based on comparing the prediction to a label that is based on whether the set of references indicates that the popular Q/A pair is relevant to the particular question;
receiving, as an output from the machine learning model, a set of probabilities indicating whether each respective Q/A pair of a subset of the set of Q/A pairs is relevant to the question;
determining, based on the set of probabilities, that at least one Q/A pair of the subset is relevant to the question; and
displaying an indication via the user interface that the at least one Q/A pair is relevant to the question.

10. The method of claim 9, further comprising:
determining that an additional Q/A pair of the set of Q/A pairs is grouped with the at least one Q/A pair; and
displaying an additional indication via the user interface that the additional Q/A pair is relevant to the question.

11. The method of claim 10, wherein the additional Q/A pair has been grouped with the at least one Q/A pair based on a similarity measure between a first output from the machine learning model corresponding to the additional Q/A pair and a second output from the machine learning model corresponding to the at least one Q/A pair.

12. The method of claim 9, further comprising:
receiving, via the user interface, a selection of the at least one Q/A pair in the displayed indication; and
displaying, via the user interface, in response to the selection, the at least one Q/A pair.

13. The method of claim 9, wherein the machine learning model is a neural network comprising: an embedding layer;

a long short term memory (LSTM) layer; one or more fully connected layers; and a softmax layer.

14. A system, comprising one or more processors and a non-transitory computer-readable medium comprising instructions that, when executed by the one or more processors, cause the system to:

receive a set of question and answer (Q/A) pairs;

identify a set of references in the set of Q/A pairs that link pairs of Q/A pairs of the set of Q/A pairs, wherein the set of references is based on at least an identifier of a first Q/A pair of the set of Q/A pairs being included in a second Q/A pair of the set of Q/A pairs;

identify popular Q/A pairs of the set of Q/A pairs based on the set of references, wherein:

the popular Q/A pairs are referenced by a subset of the set of Q/A pairs;

identifiers of the popular Q/A pairs are included in specific Q/A pairs of the subset of the set of Q/A pairs; and each respective Q/A pair of the subset of the set of Q/A pairs comprises a respective question of a plurality of questions; and train a machine learning model through a supervised learning process to predict Q/A pairs of the set of Q/A pairs that are relevant to a given question, wherein the supervised learning process comprises providing a particular question of the plurality of questions to the machine learning model, receiving a prediction from the machine learning model as to whether a popular Q/A pair of the Q/A pairs is relevant to the particular question, and iteratively adjusting parameters of the machine learning model based on comparing the prediction to a label that is based on whether the set of references indicates that the popular Q/A pair is relevant to the particular question.

15. The system of claim 14, wherein identifying the popular Q/A pairs of the set of Q/A pairs based on the set of references comprises:

determining, for each given Q/A pair of the set of Q/A pairs, a given number of references of the set of references that reference the given Q/A pair; and determining popularity metrics for the set of Q/A pairs based on the given number of references for each given Q/A pair of the set of Q/A pairs.

16. The system of claim 14, wherein training the machine learning model comprises:

generating a multi-dimensional representation of each given question of the plurality of questions as a set of features for the given question; and generating training data wherein the set of features for each given question of the plurality of questions is associated with each given popular Q/A pair of the set of Q/A pairs that is referenced in the set of references by a given Q/A pair of the set of Q/A pairs corresponding to the given question.

17. The system of claim 14, wherein the machine learning model is trained to output probabilities with respect to given Q/A pairs of the set of Q/A pairs in response to an input question.

18. The system of claim 14, wherein the plurality of questions is a subset of a set of questions included in the set of Q/A pairs, and wherein the system is further configured to:

for each respective question of the set of questions:

provide respective input to the machine learning model based on the respective question; and receive a respective set of probabilities as a respective output from the machine learning model in response to the respective input.

19. The system of claim 18, wherein the system is further configured to identify groups of questions of the set of questions based on the respective set of probabilities for each respective question of the set of questions.

20. The system of claim 19, wherein the system is further configured to provide relevant questions to a particular question via a user interface based on outputs from the machine learning model in response to the particular question and the groups of questions.

* * * * *